(12) United States Patent
Tzabari

(10) Patent No.: US 11,174,006 B2
(45) Date of Patent: Nov. 16, 2021

(54) HIGH-LIFT ACTUATION SYSTEM WITH CLUTCH ARCHITECTURE

(71) Applicant: Bombardier Inc., Dorval (CA)

(72) Inventor: Ehud Tzabari, St-Laurent (CA)

(73) Assignee: BOMBARDIER INC.

( * ) Notice: Subject to any disclaimer, the term of this patent is extended or adjusted under 35 U.S.C. 154(b) by 141 days.

(21) Appl. No.: 16/560,261

(22) Filed: Sep. 4, 2019

(65) Prior Publication Data

US 2020/0070953 A1    Mar. 5, 2020

Related U.S. Application Data

(60) Provisional application No. 62/726,609, filed on Sep. 4, 2018.

(51) Int. Cl.

| | |
|---|---|
| *B64C 13/00* | (2006.01) |
| *B64C 13/28* | (2006.01) |
| *B64C 9/12* | (2006.01) |
| *F16H 48/22* | (2006.01) |
| *F16H 48/24* | (2006.01) |
| *B64C 13/50* | (2006.01) |

(52) U.S. Cl.
CPC ............... *B64C 13/28* (2013.01); *B64C 9/12* (2013.01); *B64C 13/503* (2013.01); *F16H 48/22* (2013.01); *F16H 48/24* (2013.01)

(58) Field of Classification Search
CPC .......... B64C 9/12; B64C 13/28; B64C 13/341
See application file for complete search history.

(56) References Cited

U.S. PATENT DOCUMENTS

| | | |
|---|---|---|
| 5,082,208 A | 1/1992 | Matich |
| 7,051,975 B2 | 5/2006 | Pohl et al. |
| 9,260,181 B2 | 2/2016 | Conrad et al. |

(Continued)

FOREIGN PATENT DOCUMENTS

| | | | |
|---|---|---|---|
| DE | 102011117706 A1 | 5/2013 | |
| DE | 102012022287 A1 * | 5/2014 | ............... B64C 9/16 |

(Continued)

OTHER PUBLICATIONS

European Search Report dated Jan. 8, 2020 related to corresponding to European Patent Application No. 19195087.2.

*Primary Examiner* — Richard G Davis
(74) *Attorney, Agent, or Firm* — Fishman Stewart PLLC

(57) ABSTRACT

A drive apparatus for differentially actuating a plurality of high-lift surfaces of an aircraft may include a common rotary and a plurality of clutches incorporated into the common driveline. The plurality of clutches may include a first clutch provided between a first outboard driveline section and a central driveline section of the common driveline, and a second clutch provided between a second outboard driveline section and the central driveline section of the common driveline. A first and second power drive unit (PDU) may be arranged remote from a fuselage of the aircraft and mechanically coupled to the common driveline at a drive connection disposed in a region of the first clutch and the second clutch, respectively. The first clutch and the second clutch may mechanically connect and disconnect the first and second outboard driveline section from the central driveline section, respectively.

16 Claims, 7 Drawing Sheets

(56) References Cited

U.S. PATENT DOCUMENTS

| | | | | |
|---|---|---|---|---|
| 2014/0097292 | A1* | 4/2014 | Hauber | B64C 13/26 |
| | | | | 244/99.2 |
| 2015/0321750 | A1* | 11/2015 | Denzler | B64D 45/0005 |
| | | | | 244/219 |
| 2016/0355253 | A1 | 12/2016 | Nfonguem et al. | |
| 2018/0002028 | A1* | 1/2018 | Polcuch | F15B 11/024 |

FOREIGN PATENT DOCUMENTS

| | | |
|---|---|---|
| DE | 102012022287 A1 | 5/2014 |
| DE | 102015201935 A1 | 8/2016 |
| DE | 102017111553 A1 | 1/2018 |
| EP | 2695810 A1 | 2/2014 |

\* cited by examiner

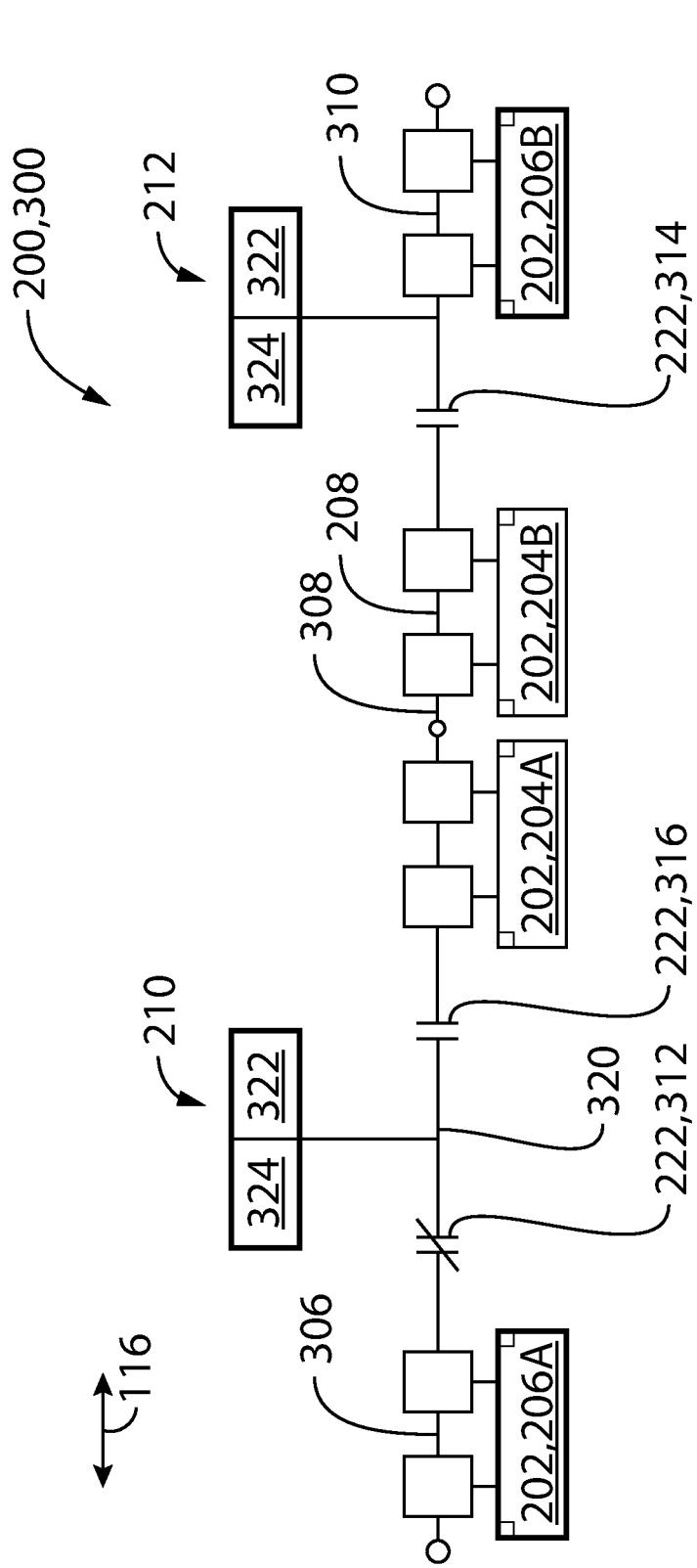

HIGH-LIFT ACTUATION SYSTEM WITH CLUTCH ARCHITECTURE

CROSS-REFERENCE TO RELATED APPLICATIONS

This application claims priority to U.S. Provisional Patent Application No. 62/726,609, filed on Sep. 4, 2018, the contents of which are hereby incorporated in its entirety.

TECHNICAL FIELD

The present disclosure relates generally to actuation of flight control surfaces of an aircraft, and more particularly to a drive apparatus and high-lift actuation system for differentially actuating a plurality of high-lift surfaces of an aircraft.

BACKGROUND

Many fixed-wing aircraft comprise high-lift flight control surfaces that are deployed and/or retracted to change an amount of lift generated by a wing during some phases of flight. On some aircraft, such high-lift flight control surfaces may comprise a plurality of leading edge slats and also a plurality of trailing edge flaps. The actuation system of an aircraft may consist of a central drive unit located in the middle of an aircraft fuselage, a transmission shaft system and local mechanical actuators on corresponding support stations of the movable slats or flaps. Arranging the central drive unit in the region of the fuselage requires substantial changes in angle for torque transmission. Accordingly, the central drive unit is usually driven by two motors that are active in parallel, with the drive output of the motors being transferred to the shaft system by way of a differential gearbox. A differential gearbox, also referred to as a speed-summing gearbox, is characterized by a gear train with three shafts operably coupled such that the rotation speed of one shaft is the sum of the speeds of the others, and is relatively heavy and complex. The central drive unit actuates the high-lift flight control surfaces simultaneously in unison, e.g., the inboard and outboard trailing edge flaps are actuated as a single system. This central drive unit architecture assures synchronous deployment of all high-lift surfaces coupled to the system but prohibits functional flexibility and may increase cabin noise due to the arrangement in a region of the fuselage.

It may be desirable to actuate the outboard devices at different times and/or to different positions relative to the inboard devices and relative to each other, for example to vary the camber of the wing. Variable camber systems are often used in aircraft to change the curvature (camber) of the wing. In conventional common shaft systems, independent surface actuation (e.g., variable camber) requires a complex architecture of differential gearboxes separating the inboard and outboard devices on each wing. To implement the independent flap actuation, a secondary drive unit with a differential gearbox may be coupled to the transmission shafts of adjacent flaps in addition to the central drive unit. The speed of the transmission shafts at the output of the differential gearbox depends on the input speeds of the central drive unit and also the secondary drive unit, as the output speed is the sum of the two input speeds and is thus largely independent of the speed of the transmission shaft driven by the central drive unit.

Differential gearboxes are heavy and typically include an additional reduction gearbox, require significant installation space, and may lead to speed run-away (asymmetrical rotation of the output shafts) that may cause undesirable behavior such as asymmetric operation of the adjacent flaps.

Overcoming these concerns would be desirable. Thus, there is a need for improved high-lift architectures and systems that minimize complexities while enabling independent actuation of outboard and inboard devices.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

FIGS. 5A to 5C illustrate schematic representations of the high-lift system of FIG. 2 in different configurations.

DETAILED DESCRIPTION

Figure 1:
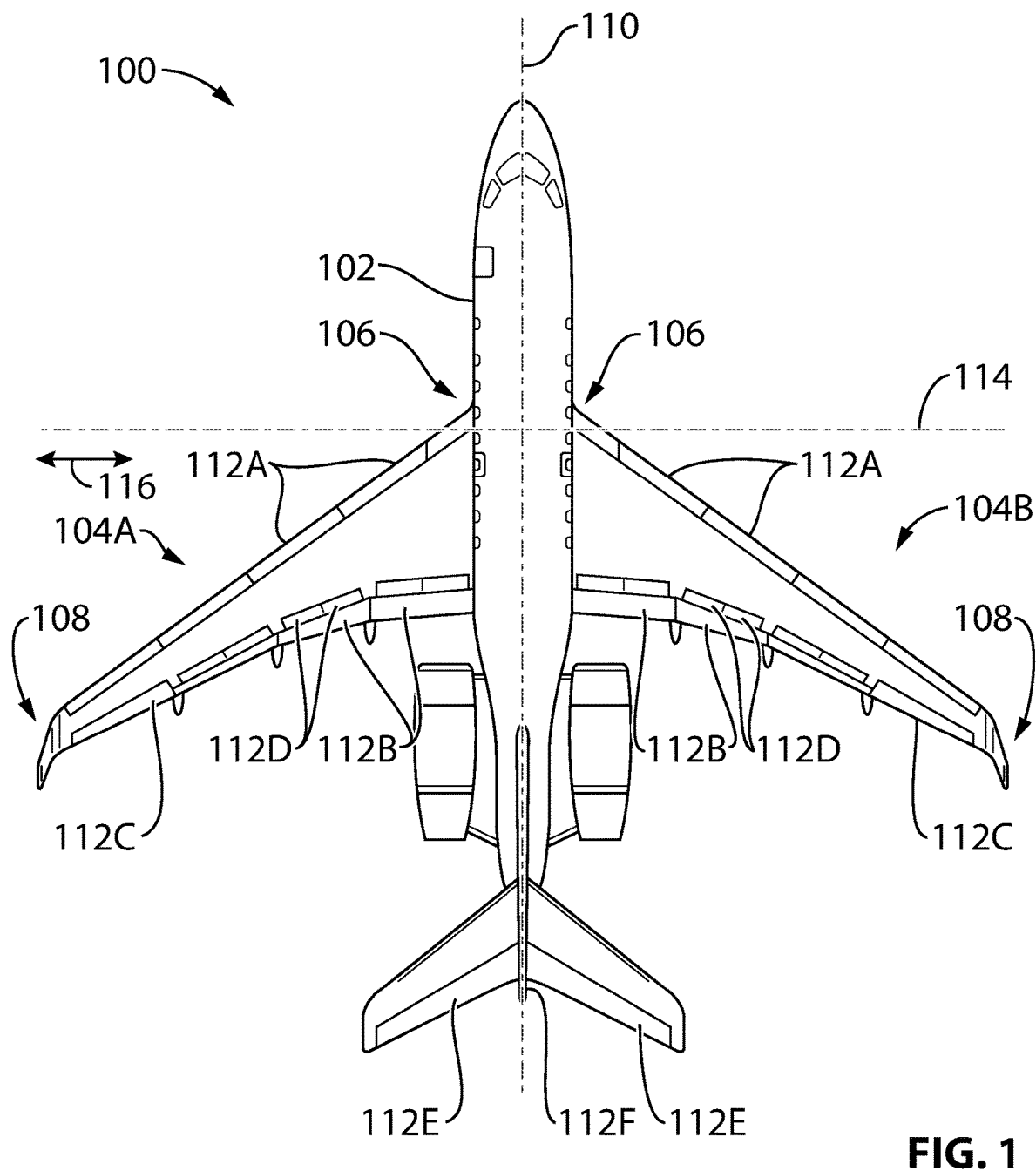
FIG. 1 illustrates a top plan view of an exemplary aircraft.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The present disclosure relates to the actuation of flight control surfaces of aircraft. In various aspects, the present disclosure describes systems, components, apparatus and methods useful in the actuation of high-lift surfaces of aircraft or other actuatable members. The systems, components, apparatus and methods disclosed herein may, for example, be useful in the differential actuation of high-lift surfaces such as leading edge slats and/or trailing edge flaps of fixed-wing aircraft. However, it is understood that systems, components, apparatus and methods disclosed herein may be used in conjunction with other types of flight control surfaces and with other types of aircraft than those exemplified herein. Differential actuation of high-lift surfaces, as referenced in the present disclosure, is intended to encompass actuation of two or more high-lift surfaces (e.g., per wing side) by different amounts (e.g., to achieve different position settings relative to each other) and/or in different directions (e.g., a retract direction and an extend direction), whether via simultaneous actuation or not (e.g., including separate actuation at different times). It is also understood that, in various aspects, the systems, components, apparatus and methods disclosed herein may be used for other type(s) of actuation including, for example, simultaneous actuation of a plurality of high-lift surfaces in unison (e.g., synchronously) or the actuation of a single flight control surface. It is also understood that, the systems, components, apparatus and methods disclosed herein may be used in conjunction with actuatable members (e.g., in aerospace or non-aerospace applications) other than those exemplified herein.

In some aspects, the systems, components, apparatus and methods disclosed herein may, for example, permit the tailoring of a lift distribution along a spanwise direction of a wing of a fixed-wing aircraft (e.g., during flight). For example, the differential actuation of high-lift surfaces along a wing may be used to selectively adjust the camber of the wing by different amounts at different spanwise locations of the wing by deploying individual high-lift surfaces disposed at different spanwise locations of the wing by different amounts. This includes synchronous motion where two or more high-lift surfaces of the wing are moved simultaneously in unison, asynchronous motion where at least one high-lift surface moves relative to at least one stationary high-lift surface of the wing, and/or asynchronous motion where two or more high-lift surfaces are moved at different speeds relative to one another. Among other benefits, the selective tailoring of the lift distribution along the spanwise direction of the wing may permit, for example, shifting a resultant lift force on a wing closer to the root of the wing (i.e., inboard) to alleviate the bending moment induced on the wing by the lift generated by the wing. Other spanwise lift distributions may be suitable for different phases of flight and/or conditions.

An exemplary drive apparatus and high-lift actuation system for differentially actuating a plurality of high-lift surfaces of an aircraft, are described herein.

According to a first aspect, there is provided a drive apparatus for differentially actuating a plurality of high-lift surfaces of an aircraft, the drive apparatus including: a common rotary or movable driveline mechanically connected to the plurality of high-lift surfaces, the common rotary driveline having a central driveline section couplable to a first outboard driveline section and a second outboard driveline section, the first outboard driveline section and the second outboard driveline section extending outboard from the central driveline section; and a plurality of clutches incorporated into the common rotary driveline, the plurality of clutches including a first clutch provided between the first outboard driveline section and the central driveline section, and a second clutch provided between the second outboard driveline section and the central driveline section. The first clutch and the second clutch may be structured and arranged to mechanically (e.g., couple) and disconnect (e.g., decouple), either directly or indirectly, the first outboard driveline section and the second outboard driveline section from the central driveline section, respectively. The provision of a common driveline for actuating the high-lift surfaces facilitates synchronous deployment of the high-lift surfaces as well as a common fail-safe load path, and the provision of a plurality of clutches permits functional flexibility for differential actuation of the high-lift surfaces.

The drive apparatus may include a first power drive unit (PDU) mechanically coupled to the common rotary driveline at a drive connection disposed in a region of the first clutch, and a second PDU mechanically coupled to the common rotary driveline at a drive connection disposed in a region of the second clutch. The provision of multiple PDUs and clutches connected to a common power transmission driveline permits different wing system topologies without the complexity and additional weight associated with differential transmission systems. Further, the interplay between the plurality of clutches, the PDUs, and the common driveline permits independent actuation of the high-lift surfaces to implement high-lift functionalities such as variable camber to reduce drag, wing load shifting or differential flap control to reduce wing bending, and roll trim.

The common driveline may extend transversely to a central longitudinal axis of the aircraft in a spanwise direction between a first end and a second end opposite the first end with respect to the central longitudinal axis. The central driveline section may extend in the spanwise direction through the central longitudinal axis, and the first outboard driveline section and the second outboard driveline section may extend between the central driveline section and the first end and the second end of the common driveline, respectively. The common driveline provides a fail-safe load path between the first PDU and the second PDU such that if one of the PDUs fail, then the other, working PDU can still drive the high-lift surfaces on one or more wings of the aircraft. Further, the transmission system using a common driveline disclosed herein facilitates improvements with respect to cost and weight savings as well as an overall simpler control technology when compared to synchronized coupling of high-lift surfaces comprising individual drives (so-called distributed systems), which have lower overall reliability as synchronization is performed merely electrically.

The plurality of clutches may each comprise normally closed (e.g., engaged), dual channel clutches that interface with two control channels for activation and/or power. The first clutch may be arranged outboard of the first PDU to selectively decouple the first outboard driveline section from the drive connection of the first PDU and of the second PDU, and the second clutch may be arranged inboard of the second PDU to selectively decouple the central driveline section from the drive connection of the second PDU. Thus, the respective outboard driveline sections for actuating, e.g., a corresponding outboard high-lift surface, may be driven independently of the central driveline section to permit a differential adjustment of the outboard high-lift surfaces.

Additional flexibility may be derived by incorporating a third clutch of the plurality of clutches between the first clutch and the central driveline section, and may be configured to selectively decouple the central driveline section from the drive connection of the first PDU. For example, the third clutch may be arranged inboard of the first clutch between the first outboard driveline section and the central driveline section so that the drive connection of the first PDU is interposed between the first clutch and the third clutch. Accordingly, the third clutch may mechanically connect (e.g., couple) and disconnect (e.g., decouple) the central driveline section from the first clutch and thus from the first outboard driveline section when the first clutch is engaged, and the first clutch may mechanically connect and disconnect the first outboard driveline section from the third clutch and thus the central driveline section when the third clutch is engaged. Further, the third clutch may, in conjunction with the first and second clutch, selectively mechanically connect one PDU and disconnect the other PDU from the central driveline section to drive the central driveline section independent from the respective outboard driveline sections. In this case, the first and second clutch may each be disengaged (e.g., activated and open) to mechanically isolate the first outboard driveline section and the second outboard driveline section from the power transmission.

Pursuant to an implementation, the first PDU may be arranged in a first wing and the second PDU may be arranged in a second wing to facilitate a reduction in cabin noise as compared to conventional common shaft systems having a central PDU arranged in a region of the fuselage. For example, the first PDU and the second PDU may be arranged between an inboard and an outboard high-lift surface of the first wing and the second wing, respectively, to facilitate installation space savings. The first PDU may be interposed between the first and third clutch, which may allow selective operation of the first PDU to drive the central driveline section (e.g., when the third clutch is engaged and the first clutch is disengaged) or to drive the first outboard driveline section (e.g., when the first clutch is engaged and the third clutch is disengaged), and to provide a connection between the central driveline section and the first outboard driveline section (e.g., when the first and third clutches are engaged). Additionally or alternatively, the second PDU may be disposed outboard of the second clutch and mechanically joined to the second outboard driveline section, e.g., directly or through a permanent mechanical coupling. When the first, second, and third clutches are engaged (e.g., closed), the individual sections of the common driveline may be rotationally connected (e.g., rotate as a single unit) to provide a fail-safe load path and mechanically synchronize rotation of the individual sections of the common driveline.

Pursuant to a further implementation, the second PDU may comprise a motor having a rate capability that is different from that of the first PDU. For example, the second PDU may operate at full speed/full torque and the first PDU may operate at half speed/full torque and can thus be made smaller and lighter than the second PDU to facilitate further weight gains. The first and second PDU may each include a single motor, at least one brake, and a gearbox (e.g., a reduction gearbox). Pursuant to a non-limiting example, the motor of the first PDU may be electric and the motor of the second PDU may be hydraulic.

The high-lift surfaces may be respectively coupled to the common driveline via a plurality of corresponding actuating stations that each include at least one actuator, such as a linear or rotary-type actuator, where each high-lift surface interacts with at least one associated actuating station. The actuating stations may include at least two first actuating stations coupled to the common driveline at different spanwise locations between the central longitudinal axis and an end of the first outboard driveline section, and at least two second actuating stations coupled to the common driveline at different spanwise locations between the central longitudinal axis and an end of the second outboard driveline section. The first and second PDU may be arranged between an inboard surface actuating station and outboard surface actuating station of the at least two first actuating stations and the at least two second actuating stations, respectively, e.g., between an inboard and outboard surface actuating station on each wing. The respective inboard surface actuating stations of the first and second wing may be mechanically joined to the central driveline section that provides a continuous torque-transmitting load path in a spanwise direction, e.g., without an intervening coupling/separating device such as a clutch. The plurality of clutches may mechanically connect and disconnect the respective outboard surface actuating station with the respective inboard surface actuating station of each wing.

To implement the high-lift function, the second PDU may drive the common driveline for the simultaneous or synchronous actuation of the high-lift surfaces, and the first PDU may be back-driven during normal operation. The clutches, which may be configured normally closed by default, are engaged and thus transmit the drive power of the second PDU to the high-lift surfaces on each wing via the common driveline. If the second PDU is inoperative (e.g., due to a failure), the first PDU is configured to drive the entire system and the second PDU may be back-driven. To provide a differential adjustment of the high-lift surfaces, for example to drive the inboard high-lift surfaces of each wing independently of the respective outboard high-lift surfaces, the first and second clutches may be activated, that is disengaged or open, and the first PDU may drive the common driveline to actuate the inboard high-lift surfaces via the third clutch and the central driveline section. The respective outboard high-lift surfaces may remain stationary during actuation of the inboard high-lift surfaces. Additionally or alternatively, a differential adjustment of the outboard high-lift surfaces may be provided by activating the second and third clutch (e.g., the second and third clutch are open or disengaged) and driving the outboard high-lift surfaces of the first and second wing via the first and second PDU, respectively. The respective inboard high-lift surfaces may remain stationary during actuation of the outboard high-lift surfaces. The first PDU may drive the outboard high-lift surface of the first wing via the first clutch and the first outboard driveline section, and the second PDU may drive the outboard high-lift surface of the second wing via the second outboard driveline section without an intervening clutch. The first and second PDU may operate to symmetrically actuate the outboard high-lift surfaces, or to asymmetrically actuate the outboard high-lift surfaces.

According to a second aspect, a high-lift actuation system of an aircraft includes a common rotary (movable) driveline mechanically connected to a plurality of high-lift surfaces of a first wing and a second wing; a first power drive unit (PDU) arranged in the first wing between a first inboard high-lift surface and a first outboard high-lift surface of the plurality of high-lift surfaces; a second PDU arranged in the second wing between a second inboard high-lift surface and a second outboard high-lift surface of the plurality of high-lift surfaces; and a plurality of clutches disposed at different spanwise locations on the common driveline, structured and arranged to selectively transmit power along the common driveline in a spanwise direction to the plurality of high-lift surfaces. The plurality of clutches may be selectively operable in conjunction with the first PDU and the second PDU to actuate the first outboard high-lift surface and the second outboard high-lift surface independently of the first inboard high-lift surface and the second inboard high-lift surface. Additionally or alternatively, the plurality of clutches may be selectively operable in conjunction with the first PDU and the second PDU to actuate the first outboard high-lift surface and the second outboard high-lift surface independently of one another.

Pursuant to an implementation, the plurality of clutches include a first clutch arranged between the first PDU and the first outboard high-lift surface, a second clutch arranged between the second PDU and the second inboard high-lift device, and a third clutch arranged between the first PDU and the first inboard high-lift surface, wherein the second clutch and the third clutch are mechanically coupled via a central driveline section of the common driveline. By way of the structure and arrangement of the plurality of clutches, the first inboard high-lift surface and the second inboard high-lift surface are mechanically synchronized via the central driveline section.

The high-lift actuation system may include a plurality of local actuating stations distributed in the spanwise direction that are operably connected to the common driveline for transferring power to the plurality of high-lift surfaces. The plurality of actuating stations may each comprise at least one irreversible actuator operably coupled to a respective one of the plurality of high-lift surfaces.

To operate the high-lift function, the second PDU may actuate the plurality of high-lift surfaces when the plurality of clutches are engaged, and the first PDU is back-driven. Additionally or alternatively, the first PDU may be configured to actuate the first inboard high-lift surface and the second inboard high-lift surface independent of the first outboard high-lift surface and the second outboard high-lift surface when the first clutch and the second clutch are disengaged (e.g., open) with the third clutch engaged (e.g., closed). Additionally or alternatively, the first PDU may be configured to independently actuate the first outboard high-lift surface when the first clutch is engaged and the third clutch is disengaged. Pursuant to an implementation, the second clutch may also be disengaged to permit the second PDU to independently actuate the second outboard high-lift surface. The first PDU and the second PDU may therefore actuate the first outboard high-lift surface and the second outboard high-lift surface, respectively, independently from one another and independently of the first inboard high-lift surface and the second inboard high-lift surface when the second clutch and the third clutch are disengaged with the first clutch engaged.

Pursuant to a further implementation, a controller may be provided that is operably coupled to the first and second PDUs and the first, second, and third clutches, wherein the controller is configured to selectively control the first PDU and the second PDU and the plurality of clutches to actuate one or more high-lift surfaces symmetrically or asymmetrically, respectively. For example, the controller may operate the first and second PDUs and control the plurality of clutches so that the second and third clutch are disengaged with the first clutch engaged to actuate the first and second outboard high-lift surfaces independently from one another and independently of the first and second inboard high-lift surfaces. The controller may receive position information in the form of signals provided by positions sensors incorporated into the common driveline and/or the respective PDUs and/or the respective high-lift surfaces, and the controller may selectively operate the first PDU and the second PDU to electronically coordinate synchronized movements (e.g., symmetrical operation of two or more high-lift surfaces) and controlled differential movements (e.g., asymmetrical operation of two or more high-lift surfaces) of the plurality of high-lift surfaces.

Pursuant to another implementation, the second PDU may be rated to drive the entire system and the first PDU may have a lower rate capability. For example, the first PDU may comprise a motor that operates at a fraction of the speed as the motor of the second PDU. Further, the first PDU and the second PDU may produce full torque at all rotor positions to actuate the high-lift surfaces at any position. Additionally or alternatively, the motor of the second PDU may comprise a hydraulic or hydromechanical motor, and the motor of the first PDU may comprise an electric or electromechanical motor.

According to a third aspect, an aircraft is provided with the high-lift actuation system of the above-mentioned kind.

According to a fourth aspect, a method for differentially actuating a plurality of high-lift surfaces of an aircraft using a common driveline may include adjusting a relative position between a first outboard high-lift surface and a first inboard high-lift surface of the plurality of high-lift surfaces on a first wing by mechanically decoupling a first outboard driveline section coupled to the first outboard high-lift surface from a central driveline section coupled to the first inboard high-lift surface and driving one of the first outboard driveline section and the central driveline section via a first PDU (that is, driving either the first outboard driveline section or the central driveline section); and mechanically imparting relative movement between a second inboard high-lift surface and a second outboard high-lift surface of the plurality of high-lift surfaces on a second wing by mechanically decoupling the central driveline section coupled to the second inboard high-lift surface from a second outboard driveline section coupled to the second outboard high-lift surface.

Pursuant to an implementation, mechanically imparting relative movement between the second inboard high-lift surface and the second outboard high-lift surface may include driving via a second PDU the second outboard driveline section of the second outboard high-lift surface independently of the first PDU, wherein the first PDU actuates the first outboard high-lift surface by driving the first outboard driveline section to adjust the position of the first outboard high-lift surface relative to the first inboard high-lift surface, and the first inboard high-lift surface and the second inboard high-lift surface remain stationary. The first PDU and the second PDU may operate to move the first outboard high-lift surface and the second outboard high-lift surface symmetrically. Further, the first PDU and the second PDU may to move the first outboard high-lift surface and the second outboard high-lift surface asymmetrically, including movements in different directions and/or by different amounts.

Pursuant to another implementation, adjusting the relative position between first outboard high-lift surface and the first inboard high-lift surface may include mechanically decoupling the first outboard driveline section of the first outboard high-lift surface from the first PDU, driving the central driveline section of the first inboard high-lift surface, decoupling the second outboard driveline section from the central driveline section, and deactivating the second PDU, thereby mechanically moving the second inboard high-lift surface in conjunction with the first inboard high-lift surface and independently of the first outboard high-lift surface and the second outboard high-lift surface.

Implementations of the disclosure may include combinations of the above-described features. Details of these and other aspects of the disclosure will be apparent from the following discussion of but one non-limiting example of a drive apparatus and high-lift actuation system for differentially actuating a plurality of high-lift surfaces of an aircraft.

Referring now to FIG. 1, there is shown an exemplary aircraft generally at 100, with which one or more of the systems, components, apparatus and methods of the present disclosure may be incorporated. Aircraft 100 may, for example, include any suitable aircraft such as corporate, private, commercial or any other type of aircraft that may comprise one or more flight control surfaces. Aircraft 100 may be a fixed-wing aircraft but it is understood that aspects of the present disclosure could also apply to rotary-wing aircraft. Aircraft 100 may, for example, be a narrow-body, twin engine jet airliner. The aircraft 100 may include a fuselage 102 and wings 104A, 104B attached to the fuselage 102 at a wing root 106 extending outwardly or in an outboard direction toward a wing tip 108 along a transverse axis or lateral axis or pitch axis 114 (hereafter "transverse axis 114"). In the illustrated example, the aircraft 100 has a pair of wings 104A, 104B attached to opposite sides of the fuselage 102 with respect to a roll axis or longitudinal axis or central longitudinal axis 110 (hereafter "longitudinal axis 110"), the pair of wings 104 comprising a first wing or left wing or a left-hand wing 104A (hereafter "first wing 104A") and a second wing or right wing or right-hand wing 104B (hereafter "second wing 104B"). Each wing 104A, 104B may comprise one or more movable flight control surfaces (e.g., 112A-112F). For example, each wing 104A, 104B may comprise one or more high-lift flight control surfaces including one or more leading edge slats 112A and/or one or more trailing edge flaps 112B. Leading edge slates 112A may comprise a plurality of surfaces distributed in a spanwise direction 116 along wing 104A, 104B and disposed at or near a leading edge of the wing 104A, 104B. Trailing edge flaps 112B may also comprise a plurality of surfaces distributed in a spanwise direction 116 along wing 104A, 104B and may be disposed at or near a trailing edge of wing 104A, 104B. The spanwise direction 116 is seen extending along the transverse axis 114 which runs parallel to wings 104A, 104B from wing tip 108 to wing tip 108 such that the transverse axis 114 intersects the longitudinal axis 110 of the aircraft 100. In various aspects, leading edge slats 112A and/or trailing edge flaps 112B may be considered "high-lift" surfaces or panels (hereafter "high-lift surfaces") that may be deployed to increase an amount of lift or reduce an amount of drag generated by wings 104A, 104B when deployed. For example, leading edge slats 112A and/or trailing edge flaps 112B may be deployed, on ground, during landing, take-off and/or during any other appropriate phases of flight or conditions requiring increased lift. Each wing 104A, 104B may also comprise one or more ailerons 112C and one or more spoilers 112D. Aircraft 10 may also comprise one or more elevators 112E and one or more rudders 112F.

Figure 2:
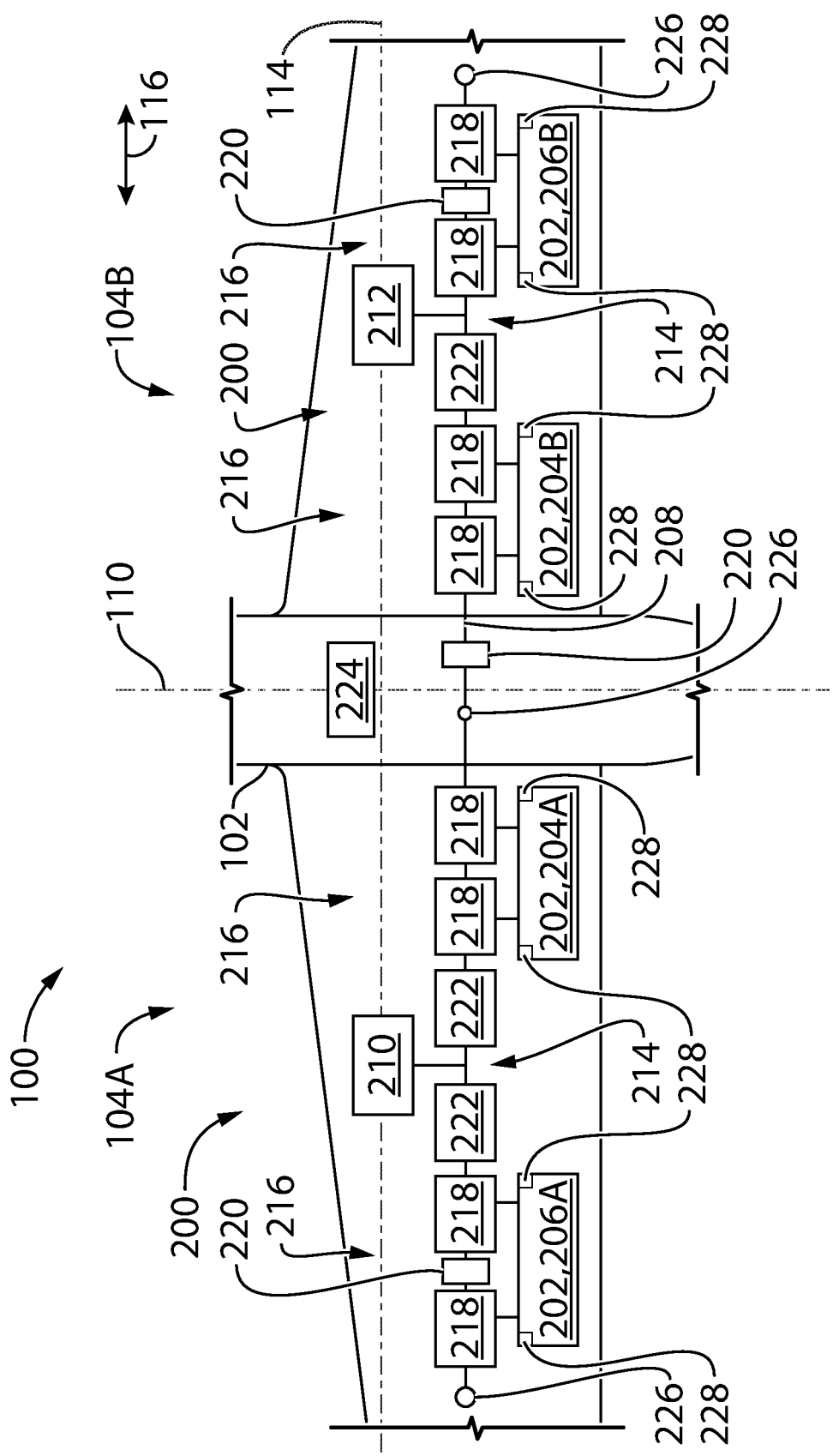
FIG. 2 illustrates a schematic representation of an exemplary high-lift system for actuating a plurality of high-lift surfaces of the aircraft of FIG. 1.

FIG. 2 is a schematic representation of an exemplary high-lift actuation system 200 including an exemplary drive apparatus 300 for differentially actuating a plurality of high-lift surfaces 202 of the aircraft 100, such as trailing edge flaps 112B as one non-limiting example. The high-lift surfaces 202 are distributed in a spanwise direction 116 and include an inboard high-lift surface 204A, 204B and an outboard high-lift surface 206A, 206B on each wing 104A, 104B. The drive apparatus 300 moves the high-lift surfaces 202 to selected positions for lift-augmentation, and the high-lift actuation system 200 coordinates the interaction of the individual components and the operation of the drive apparatus 300 to provide unitary and differential motion between the inboard high-lift surfaces 204A, 204B and the outboard high-lift surfaces 206A, 206B. The high-lift system 200 and the drive apparatus 300 enables independent actuation of the high-lift surfaces 202 that offers the capability to drive outboard high-lift surfaces 206A, 206B differently from inboard high-lift surfaces 204A, 204B and differently between first and second wing 104A, 104B, including symmetric and asymmetric operation of the outboard high-lift surfaces 206A and 206B, with benefits on aircraft level (e.g., mass savings, fuel-efficiency, reduced drag, reduced wing bending moment, and an overall simple architecture) and improvements in cost and at manufacture. Functionalities that may be implemented by the high-lift system 200 and the drive apparatus 300 include synchronous high-lift control, variable camber control, wing load shifting, and roll trim.

The high-lift surfaces 202 are actuated by a power transmission driveline 208 drivable by at least two power drive units (PDU) 210, 212, wherein the high-lift surfaces 202 are driven by at least one PDU 210, 212 via the driveline 208. The driveline 208 extends through the fuselage 102 and along support stations on each wing 104A, 104B to mechanically synchronize the high-lift surfaces 202 to thereby limit asymmetry between first and second wings 104A and 104B. The driveline 208 includes one or more rotary or movable (e.g., rotatable) members extending transversely to the longitudinal axis 110 substantially in a spanwise direction 116 (e.g., along the trailing edge of the wings 104A, 104B to mechanically couple the high-lift surfaces 202 to the PDUs 210, 212). For example, the driveline 208 may comprise a plurality of shaft sections (e.g., torque tubes or flexible shafts) mechanically coupled via suitable known or other couplings (e.g., universal joints, bearings, gearboxes, etc.) to form a common driveline for actuating (e.g., transferring power to) the high-lift surfaces 202. The PDUs 210, 212 exert a rotational motion and drive power onto the driveline 208. The PDUs 210, 212 may, for example, comprise a suitably controlled electrical or hydraulic motor and may be of a single or double motor type arrangement, and may comprise an integrated brake and sensor. According to one implementation, a first PDU 210 is arranged in the first wing 104A and a second PDU 212 is arranged in the second wing 104B between a respective inboard high-lift surface 204A, 204B and a respective outboard high-lift surface 206A, 206B. The PDUs 210, 212 may be independently operable to drive the high-lift surfaces 202, and may operate synchronously, asynchronously, symmetrically, and/or asymmetrically, as described below.

The PDUs 210, 212 may be mechanically coupled to the driveline 208 at a respective drive connection 214. Driveline 208 transmits power from a power source such as the first PDU 210 and/or the second PDU 212 to a location where it does work, e.g., the high-lift surfaces 202. The high-lift surfaces 202 are movable to selected positions by a plurality of local actuating stations 216, each including at least one actuator 218, distributed in the spanwise direction 116 where at least one actuating station 216 is provided for each high-lift surface 202. It will be appreciated that two or more actuating stations 216 may be provided per high-lift surface 202. The first and second PDU 210, 212 are interposed between an inboard surface actuating station 216 and an outboard surface actuating station 216 of each wing 104A, 104B, respectively, to facilitate symmetry between first and second wing 104A, 104B.

The local actuating stations 216 are configured to transfer power from the common driveline 208 to the plurality of high-lift surfaces 202 by way of the at least one actuator 218 mechanically interconnected between the driveline 208 and a respective high-lift surface 202. The actuating stations 216 may include additional components including, but not limited to, actuator track arrangement linkages, couplings, gears, sensors, etc., to convert a rotary movement of the driveline 208 to an adjustment movement of the region of the high-lift surface 202 coupled thereto. To provide redundancy, at least two actuating stations 216 each comprising an actuator 218 may be operably connected at sides of the respective high-lift surface 202 relative to the spanwise direction 116. The interconnection of the actuator(s) 218 of the local actuating stations 216 via the driveline 208 provides a fail-safe load path for an individual high-lift surface 202 in the case of actuator failure. The actuators 218 may each comprise a linear, rotary or other type of actuator. For example, actuators 218 may comprise screw/nut actuators (e.g., ball-screw or roller-screw), rack-and-pinion actuators and/or other suitable known or other type of actuators. Further, the actuators 218 may be reversible actuators such as the aforementioned ball-screw actuator or may be irreversible actuators such as lead or ACME screw actuators or reversible actuators having a no-back mechanism. If the actuators 218 are reversible, the aerodynamic loads may be capable of back-driving the associated high-lift surface 202 whereas irreversible actuators cannot be back-driven by the aerodynamic load and are capable of holding the high-lift surface 202 in position even without power transmission from the driveline 208.

Further, a plurality of fail-safe brakes 220 may be incorporated into the driveline 208 to brake the system 200 and/or hold the associated high-lift surface 202 at a desired position. In the illustrated example, the plurality of brakes 220 include asymmetry or wingtip brakes provided at an outboard end of the driveline 208 in a region of the respective outboard high-lift surfaces 206A and 206B (e.g., between an outboard actuator 218 and an inboard actuator 218 of a respective outboard high-lift surface 206A, 206B, or outboard of the outboard actuator 218 of a respective outboard high-lift surface 206A, 206B) and a third, central brake between each wing root 106 (e.g., in a region of the fuselage 102). The provision of irreversible actuators may advantageously prevent asymmetries between left and right wings 104A, 104B and hold the associated high-lift surface 202 in the commanded position following driveline structural failure without the use of additional fail-safe brakes 220 since these requirements are intrinsically accomplished due to the irreversible configuration.

The driveline 208 is couplable to the high-lift surfaces 202 on both the first wing 104A and the second wing 104B via a plurality of clutches 222 configured to selectively transmit power from the at least two PDUs 210, 212 to the plurality of local actuating stations 216. The clutches 222 may be incorporated into one or more of the PDUs 210, 212, or provided separate from one or more of the PDUs 210, 212. The clutches 222 may be of the normally-closed type, that is engaged by default, and each clutch 222 may interface with two control channels each being independently capable of powering and controlling the clutch 222. The clutches 222 each receive command signals and, in response, selectively mechanically couple and decouple two shaft ends to selectively engage and disengage the power that is transmitted between the two connecting shafts. The clutches 222 may comprise a positive drive clutch that delivers full power in either direction of rotation without slippage (e.g., shape-matched transmission components such as splined, ribbed or jawed clutch members). Additionally or alternatively, one or more clutches 222 may be configured to permit slippage at a predetermined torque value (e.g., friction disc clutches, either wet or dry).

The high-lift actuation system 200 additionally includes a controller 224 that has non-transitory computer-executable instructions, such as routines executed by a programmable computer. The controller 224 may be a single or multi-channel controller, and/or may comprise a plurality of controllers. It will be appreciated that the number and configuration of controllers may vary. The controller 224 is functionally connected to the PDUs 210, 212 and the clutches 222 (and the optional brakes 220) to control commands and power supply as well as receive feedback information. The controller 224 may be, for example, a multi-channel controller having at least two independent control channels separately operable to control and power the PDUs 210, 212 and the clutches 222. Further, the controller 224 may receive position signals from one or more positions sensors 226 (e.g., resolvers, transducers, etc.) on the driveline 208 or connected to the driveline 208 and/or one or more skew detection sensors 228 disposed on each high-lift surface 202. The position information provided by the position sensors 226 may be used by appropriate control routines of the controller 224 to position and/or move the high-lift surfaces 202, and may be further used by appropriate monitoring routines of the controller 224 to detect possible asymmetries between the high-lift surfaces 202 on the first and second wing 104A, 104B. The skew information provided by the skew sensors 226 may be used by the controller 224 to detect possible twists or skew in the respective high-lift surfaces 202.

Figure 3:
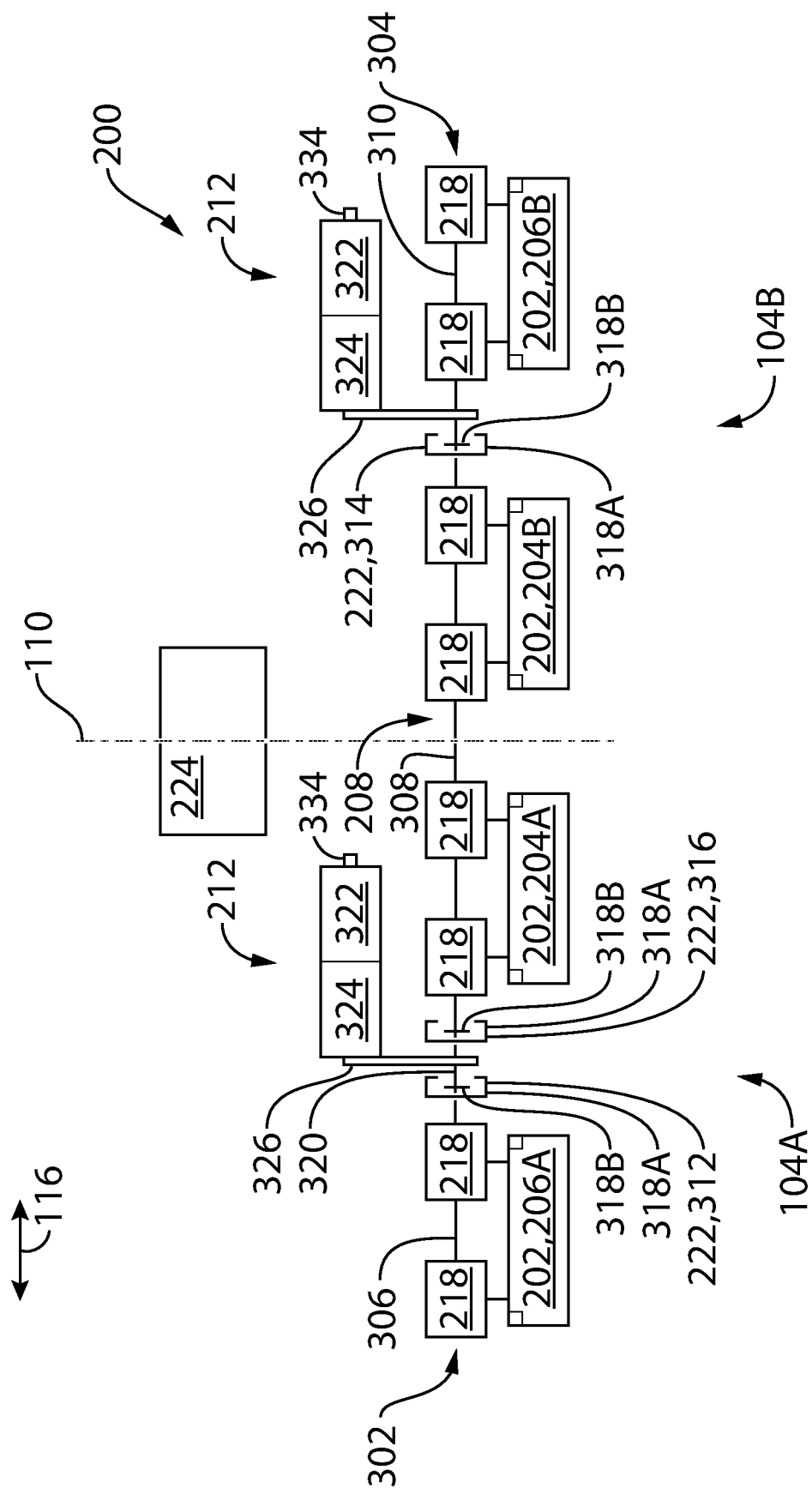
FIG. 3 illustrates a detailed schematic representation of an exemplary drive apparatus part of the system of FIG. 2.

Turning now to FIG. 3, a schematic representation of the drive apparatus 300 is shown, which may be part of the system 200. The drive apparatus 300 includes first and second PDUs 210, 212 and an arrangement of clutches 222 disposed at different spanwise locations on the common driveline 208 for differentially actuating the plurality of high-lift surfaces 202. The common driveline 208 extends transversely to the longitudinal axis 110 in a spanwise direction 116 between a first end 302 and a second end 304 opposite the first end 302 with respect to the longitudinal axis 110. The driveline 208 has a first outboard driveline section 306 operably connected (e.g., via actuating station 216 including actuator 218) to the outboard high-lift surface 206A of the first wing 104A, a central driveline section 308 operably coupled to the respective inboard high-lift surface 204A, 204B of each wing 104A, 104B, and a second outboard driveline section 310 operable coupled to the outboard high-lift surface 206B of the second wing 104B. The central driveline section 308 extends in the spanwise direction 116 through the central longitudinal axis 110 (e.g., through the fuselage 102 shown in FIG. 2), and the first outboard driveline section 306 and the second outboard driveline section 310 extend between the central driveline section 308 and the first end 302 and the second end 304 of the common driveline 208, respectively. The central driveline section 308 is couplable to the first outboard driveline section 306 and the second outboard driveline section 310 via the plurality of clutches 222. The plurality of clutches 222 are selectively operable in conjunction with the first PDU 210 and the second PDU 212 to actuate the outboard high-lift surfaces 206A, 206B independently of each other and independently of the inboard high-lift surfaces 204A, 204B, for example in response to appropriate command signals from the controller 224.

As shown in FIG. 3, the plurality of clutches 222 include a first clutch 312 and a second clutch 314 arranged between the outboard high-lift surface 206A, 206B and the inboard high-lift surface 204A, 204B of each wing, and a third clutch 316 arranged between the outboard high-lift surface 206A and the inboard high-lift surface 204A of the first wing 104A. The first PDU 210 is interposed between the first clutch 312 and the third clutch 316, and the second PDU 212 is disposed outboard of the second clutch 314. Each clutch 312-316 includes at least two coupling members 318A, 318B (e.g., shaped-matched transmission components) each joined to respective ends of adjacent driveline sections to selectively engage and disengage the power that is transmitted between the two connecting sections. The first clutch 312 has a first coupling member 318A joined to the first outboard driveline section 306 and a second coupling member 318B joined to an interconnecting driveline section 320 of the driveline 208. The third clutch 316 has a first coupling member 318A joined to the interconnecting section 320 and a second coupling member 318B joined to the central driveline section 308. The second clutch 314 has a first coupling member 318A joined to the central driveline section 308 and a second coupling member 318B joined to the second outboard driveline section 310. The clutches 312-316 are structured and arranged to mechanically connect and disconnect the respective sections 306-310 in response to command signals received from the controller 224. The first clutch 312 may selectively connect and disconnect the first outboard driveline section 306 from the first PDU 210, the third clutch 316 may selectively connect and disconnect the central driveline section 308 from the first outboard driveline section 306, and the second clutch 314 may selectively connect and disconnect the central driveline section 308 from the second PDU 212. Accordingly, the central driveline section 308 is interposed between the second clutch 314 and the third clutch 316, and mechanically synchronizes actuation of the inboard high-lift surfaces 204A, 204B. The drive connection 214 of the first PDU 210 is mechanically coupled to the interconnecting section 320, while the drive connection 214 of the second PDU 212 is mechanically coupled to the second outboard driveline section 310. Accordingly, the output of the second PDU 212 may be permanently coupled with the second outboard driveline section 310 and selectively couplable to the central driveline section 308 via the second clutch 314 and selectively couplable to the first outboard driveline section 306 via the first clutch 312 and the third clutch 316.

The PDUs 210, 212 each comprise at least one motor 322 and a gearbox 326. The PDUs 210, 212 may further comprise at least one brake 324 and an integrated sensor 334. Each motor 322 may interface with two control channels and two power sources and may be powered by either one. Pursuant to the illustrated example, the first PDU 210 has a single motor 322, such as an electric motor, a dual-channel brake 324, and a reduction gearbox 326. The second PDU 212 may similarly have a single motor 322, such as a hydraulic motor, a dual-channel brake 324, and a reduction gearbox 326. With actuators 218 capable of stopping and starting at any position, for example to move the high-lift surfaces 202 into and out of variable camber, differential position, and roll trim, full torque is required at all speeds and the motors here produce full torque at all rotor positions. The motor 322 of the second PDU 212 may, pursuant to an implementation, produce full speed and full torque while the motor 322 of the first PDU 210 produces a fraction of the speed and full torque. The brake 324 stops the output of the associated motor 322 from rotating and may be functionally connected to the controller 224 and operated by command signals from the controller 224. The brakes 324 may comprise, for example, frictional power-off brakes to lock the mechanisms unless a power signal is applied, which also results in a locked PDU 210, 212 upon complete power failure. Thus, the brakes 324 may be locked by default and release (e.g., activated) when the power supply is on. The power-off brakes 324 may be preferable over active control via the motors 322 since the duty cycle for the high-lift function during flight is relatively short and the brakes 324 provide additional safety in the event of faults or failures.

Figure 4:
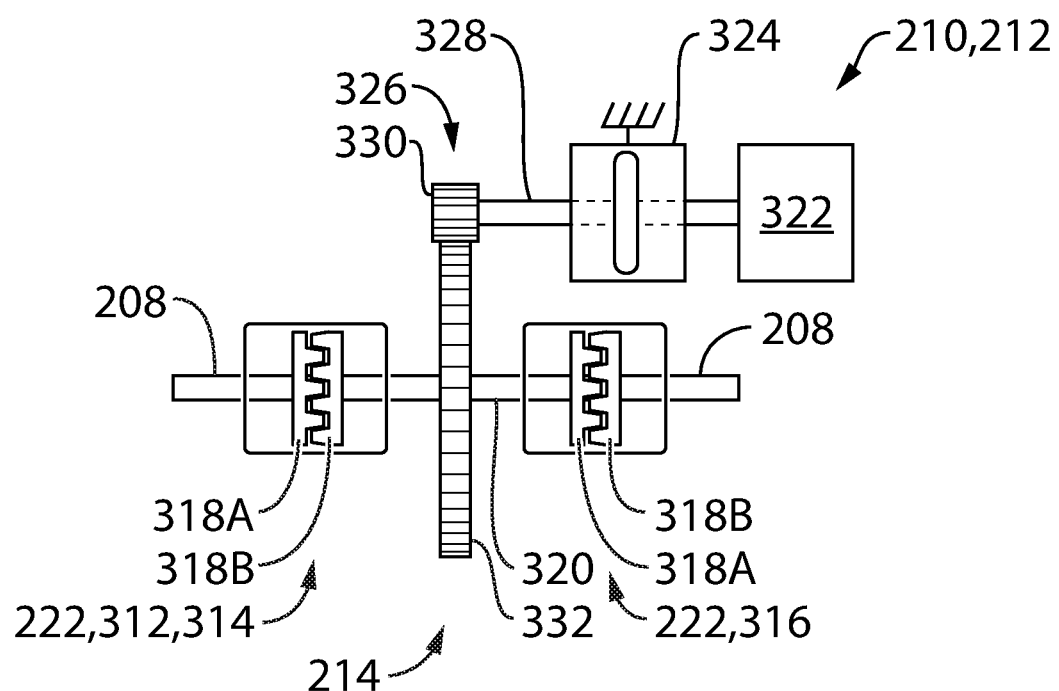
FIG. 4 illustrates a detailed schematic representation of part of the drive apparatus of FIG. 3.

With reference to FIGS. 3 and 4, the brake 324 may be arranged at the motor output 328 upstream of the gearbox 326 due to the smaller torques occurring upstream of the gearbox 326 as compared to downstream. Thus, the brake 324 can be made smaller and lighter than a brake incorporated into the driveline. The gearbox 326 may comprise a reduction gearbox (e.g., transmission of high speed/low torque to low speed/high torque) such as a simple reduction gear including an input gear 330 (e.g., a pinion) fixed to the motor output 328 that mechanically meshes (e.g., connects) with an output gear 332 (e.g., a gear wheel) fixed to the common driveline 208. The gearbox 326 may thereby form the drive connection 214 of the respective PDU 210, 212, which may deliver equal speed and power on either side of the output gear 332 to the driveline 208. The respective gears 330, 332 may rotate about a fixed axis, and may include spur, bevel, helical, worm, or other suitable gear types including parallel shaft and right-angle gearboxes. Further reduction gears may be incorporated into the gearbox arrangement for additional speed reductions. Additionally or alternatively, the gearbox 326 may include one or more idler gears (not shown) incorporated between the input gear 330 and the output gear 332. It will be appreciated that the gearbox 326 may comprise a belt train rather than a gear train without departing from the scope of the disclosure.

The clutches 312, 314, 316 may be incorporated into the driveline 208 downstream of the gearbox 326 and transfer the torque/power from the drive connection 214 to downstream sections of the driveline 208 when the coupling members 318A, 318B are engaged. It is contemplated that one or more clutches 222 may be incorporated into a respective PDU 210, 212, for example at the motor output 328. In the exemplary illustration shown in FIG. 4, the clutch 222 on the left-hand side of the gearbox 326 may correspond to the first and second clutch 312, 314, and the clutch 222 on the right-hand side of the gearbox 326 may correspond to the third clutch 316. If the clutches 312-316 are of the normally closed configuration, the coupling members 318A, 318B are engaged by default and deliver full power in either direction of rotation without slippage. The clutches 312, 314, 316 may be selectively electrically commanded, e.g., through a suitable command signal received from the controller 224, and hydraulically and/or electrically activated to disengage the coupling members 318A, 318B and permit one or more respective driveline sections 306, 308, 310, 320 to move or rotate independently of at least one other respective driveline section 306, 308, 310, 320. The clutches 312, 314, 316 may be selectively operable in conjunction with the first PDU 210 and the second PDU 212 to actuate the outboard high-lift surfaces 206A, 206B independently of each other and independently of the inboard high-lift surfaces 204A, 204B, and to actuate the inboard high-lift surfaces 204A, 204B independently of the outboard high-lift surfaces 206A, 206B.

Figure 5A:
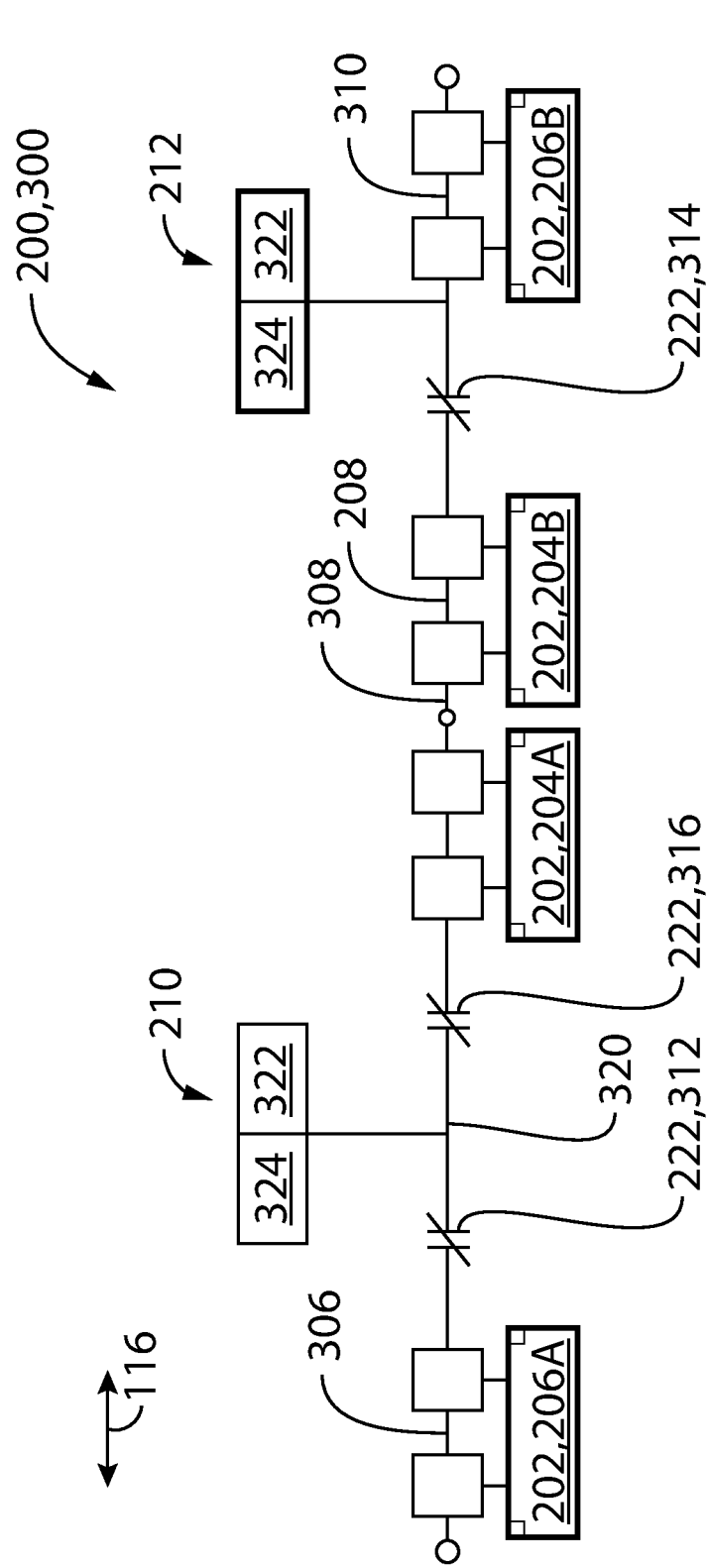

To control the high-lift function, as shown in FIG. 5A, the clutches 312, 314, 316 are closed (e.g., engaged) and the second PDU 212 drives the driveline 208 and thus the high-lift surfaces 204A, 204B, 206A, 206B on both wings. When each of the clutches 312, 314, 316 are closed, the driveline 208 mechanically interconnects the second PDU 212 to all of the high-lift surfaces 204A, 204B, 206A, 206B to provide a single torque-transmitting path in the spanwise direction 116. The second PDU 212 may be activated by releasing the associated brake 324 and/or powering the associated motor 322. The first PDU 210 in this case is back-driven during normal operation, and the associated motor 322 may be switched off (e.g., non-powered) and/or the associated brake 324 may be activated (e.g., open). The first PDU 210, however, may serve to drive the high-lift surfaces 204A, 204B, 206A, 206B for the high-lift function if the second PDU 212, e.g., the motor 322 of the second PDU 212, is inoperative and the brake 324 of the second PDU 212 is released.

Figure 5B:
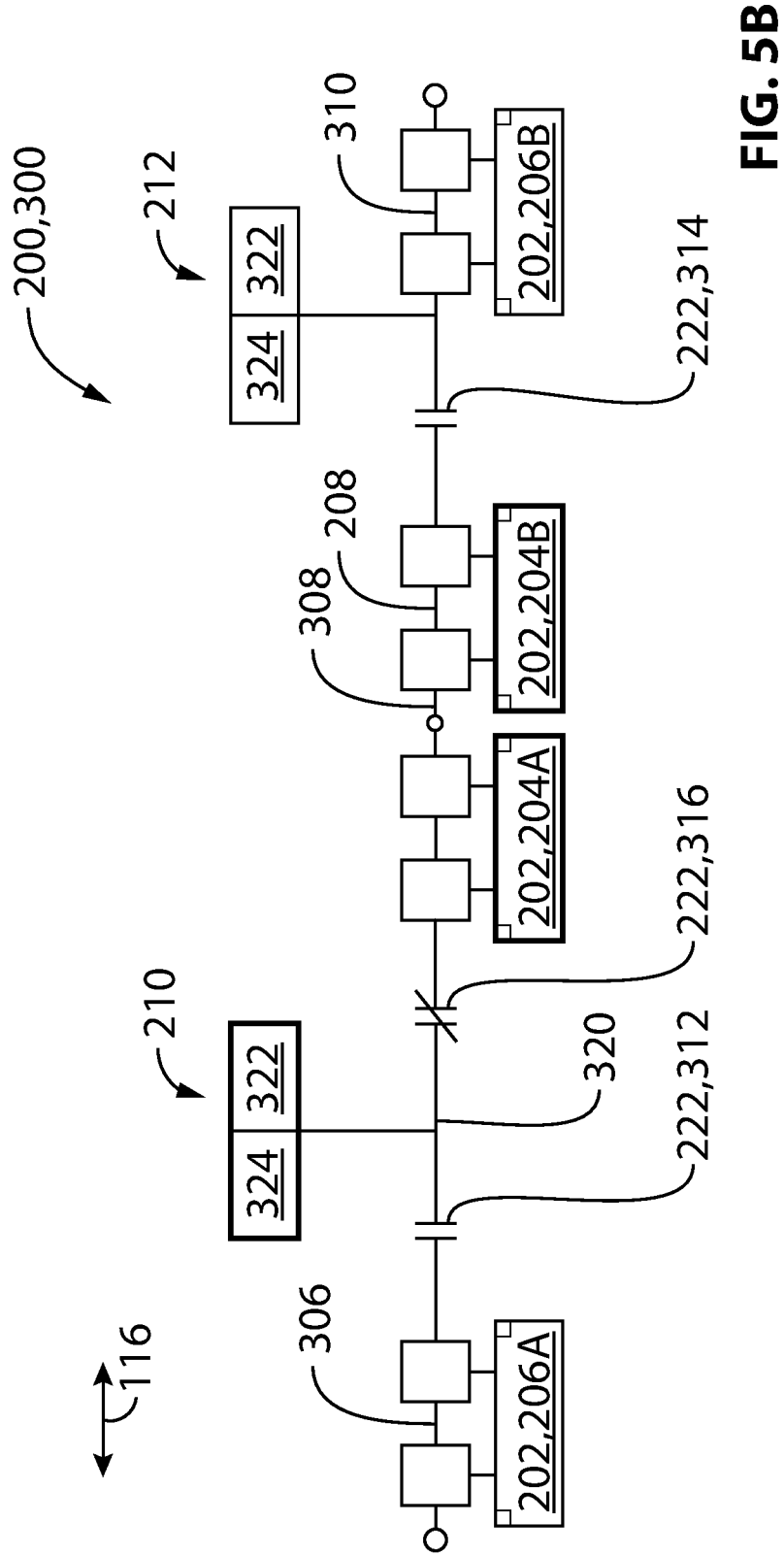

FIG. 5B shows a variable camber function where only the inboard high-lift surfaces 204A, 204B are actuated. To drive the inboard high-lift surfaces 204A, 204B only, the first clutch 312 and the second clutch 314 are open (e.g., disengaged and activated), the third clutch 316 is closed, that is, engaged, the second PDU 212 is deactivated, and the first PDU 210 drives the central driveline section 308 and thus the inboard high-lift surfaces 204A, 204B. The central driveline section 308 mechanically synchronizes the movement of the inboard high-lift surfaces 204A, 204B. The first PDU 210 may be activated by releasing the associated brake 324 and/or powering the associated motor 322. By activating the first clutch 312, the first outboard driveline section 306 is decoupled from the interconnecting driveline section 320 and thus the first PDU 210 and the central driveline section 308, while activating the second clutch 314 decouples the second outboard driveline section 310 and thus the second PDU 212 from the central driveline section 308. Therefore, the first PDU 210 is configured to actuate the inboard high-lift surfaces 204A, 204B independent of the outboard high-lift surfaces 206A, 206B when the first clutch 312 and the second clutch 314 are disengaged and the third clutch 316 is engaged.

FIG. 5C shows a variable camber function where only the outboard high-lift surfaces 206A, 206B are actuated. To drive the outboard high-lift surfaces 206A, 206B independently of the inboard high-lift surfaces 204A, 204B, the second clutch 314 and the third clutch 316 are open (e.g., disengaged and activated), the first clutch 312 is closed, that is, deactivated, and the first PDU 210 and the second PDU 212 are activated to drive the first outboard driveline section 306 and the second outboard driveline section 310, respectively. By activating the second clutch 314, the central driveline section 308 is decoupled from the second outboard driveline section 310 and thus the second PDU 212, while activating the third clutch 316 decouples the central driveline section 308 from the interconnecting driveline section 320 and thus the first PDU 210. Thus, the first PDU 210 drives the first outboard driveline section 306 and the corresponding outboard high-lift surface 206A independently from the central driveline section 308 and the second PDU 212. Similarly, the second PDU 212 drives the second outboard driveline section 310 and the corresponding outboard high-lift surface 206B independently from the central driveline section 308 and the first PDU 210. The first PDU 210 and the second PDU 212 may be activated by releasing (e.g., activating) the associated brake 324 and/or powering the associated motor 322. To actuate the outboard high-lift surfaces 206A, 206B symmetrically, the associated motor 322 of the first and second PDU 210, 212 are operated and controlled (e.g., via the controller 224) to electronically synchronize movement of the outboard high-lift surfaces 206A, 206B. Conversely, to actuate the outboard high-lift surfaces 206A, 206B asymmetrically, for a roll trim function for example, the associated motor 322 of the first and second PDU 210, 212 are operated and controlled (e.g., via the controller 224) to electronically coordinate controlled differential movement of the outboard high-lift surfaces 206A, 206B. Further, it is contemplated that the first and second PDU 210, 212 (e.g., the associate motor 322) may operate simultaneously to deploy the outboard high-lift surfaces 206A, 206B in unison (either symmetrically or asymmetrically), or at different times to deploy only one of the outboard high-lift surfaces 206A, 206B at a time.

The architecture shown in FIGS. 5A-5C employs irreversible actuators 218 capable of holding the corresponding high-lift surfaces 204A, 204B, 206A, 206B in position, thereby obviating the need for no-back or asymmetry brakes to facilitate further weight gains and reduce complexity. It should be appreciated that the architecture shown in FIGS. 5A-5C may employ fail-safe brakes 220 in conjunction with reversible actuators 218 without departing from the scope of the disclosure. Although not shown, the controller 224 (shown in FIGS. 2-3) is operatively coupled to the PDUs 210, 212 (including the associated motors 322 and optional brakes 324), clutches 312, 314, 316, and sensors 226, 228 to control, monitor and direct power thereto. The controller 224 may be configured to generate one or more output control signals to activate and deactivate (e.g., supply and remove power from) the PDUs 210, 212 and clutches 312, 314, 316. For example, the controller 224 may be configured to control the first PDU 210 and the second PDU 212 to actuate the outboard high-lift surface 206A and the second outboard high-lift surface 206B symmetrically or asymmetrically, respectively. Control signals may be generated by controller 224 based on one or more set points (e.g., that may represent one or more desired speeds and/or positions of an associated high-lift surface) and one or more feedback signals (e.g., that may represent one or more actual speeds and/or positions of the associated high-lift surface as determined by the position sensors 226 and/or skew sensors 228). The position sensors 226 may include at least one sensor 226 disposed on the first outboard driveline section 306, the central driveline section 308, and the second outboard driveline section 310, respectively, to facilitate electronically coordinating positions and movements of the high-lift surfaces 202, e.g., synchronous movements and controlled differential movements. Controller 224 may receive the set point and feedback and generate one or more error signals for the generation of control signals. Controller 224 may operate according to known or other suitable control algorithms. In various aspects, the controller 224 may be configured to conduct one or more of proportional, derivative and integral control.

Controller 224 may have a different configuration than that shown and/or described herein. For example, PDUs 210, 212 and clutches 222 may be controlled via any suitable form of feedback law(s). In various aspects, controller 224 may be implemented in analog form and/or digital form. For example, controller 224 may include one or more microcontrollers or other suitably programmed or programmable logic circuits. In various aspects, controller 224 may be incorporated with or operated in conjunction with a control system or subsystem of aircraft 100. Accordingly, controller 224 may be configured to communicate (e.g., transmit and/or receive data such as parameters, instructions, commands and status values) with one or more systems or subsystems of aircraft 100. For example, controller 224 may be part of an aircraft control system having a fly-by-wire configuration. Accordingly, the functionality of controller 224 may be integrated into and performed by one or more digital computer(s) or other data processors, sometimes referred to as flight control computers(s) (FCC) and related accessories that may control at least some aspects of performance of aircraft 100.

Controller 224 may also comprise memory(ies) including any storage means (e.g. devices) suitable for retrievably storing machine-readable instructions executable by one or more processors of controller 224. Such machine-readable instructions may be included in a computer program product. Memory(ies) may comprise any data storage devices suitable for storing data received and/or generated by controller 224, preferably retrievably. For example, memory(ies) may comprise media suitable for storing electronic data signals in volatile or non-volatile, non-transitory form. Machine-readable instructions for execution by controller 224 may cause controller 224 to generate control signals for controlling the operation of clutches 222 and PDUs 210, 212 and thereby control the deployment and retraction or one or more high-lift surfaces 202. For example, controller 224 may be configured to control the operation of a plurality of clutches 222 and thereby control the actuation of a plurality of high-lift surfaces 202. In various aspects, controller 224 may be configured to cause the individual actuation of one or more high-lift surfaces 202 and/or the simultaneous actuation of a plurality of high-lift surfaces 202 either differentially or in unison. In the case of simultaneous deployment of a plurality of high-lift surfaces 202, controller 224 may, for example, be configured to carry out electronic gearing or camming where one of high-lift surfaces 202 may be operated as a master and one or more other high-lift surfaces may be operated as one or more slaves. In various aspects, preset positions (e.g., selectable during aircraft operation either during flight or on ground) for a plurality of high-lift surfaces 202 may be stored and used by controller 224 to control the simultaneous and differential deployment or retraction of the plurality of high-lift surfaces 202. Controller 224 may also be configured to control a single clutch 222 or a plurality of clutches 222. For example, the operation of two or more clutches 222 may be coordinated to achieve actuation of a single high-lift surface 202.

According to another aspect, a method for differentially actuating a plurality of high-lift surfaces of an aircraft using a common driveline may include adjusting a relative position between a first outboard high-lift surface and a first inboard high-lift surface of the plurality of high-lift surfaces on a first wing by mechanically decoupling a first outboard driveline section coupled to the first outboard high-lift surface from a central driveline section coupled to the first inboard high-lift surface and driving one of the first outboard driveline section and the central driveline section via a first PDU (that is, driving either the first outboard driveline section or the central driveline section via the first PDU); and mechanically imparting relative movement between a second inboard high-lift surface and a second outboard high-lift surface of the plurality of high-lift surfaces on a second wing by mechanically decoupling the central driveline section coupled to the second inboard high-lift surface from a second outboard driveline section coupled to the second outboard high-lift surface. For example, the first and second clutch 312, 314 may be disengaged (e.g., activated and decoupled) with the third clutch 316 engaged (e.g., deactivated and coupled) and the first PDU 210 may drive the central driveline section 308 to actuate the inboard high-lift surface 204A independently of the outboard high-lift surface 206A and thereby adjust a relative position between the high-lift surfaces 204A and 206A, and by driving the central driveline section 308 cause the inboard high-lift surface 204B to mechanically move independently of the outboard high-lift surface 206B and thereby mechanically impart relative movement between the high-lift surfaces 204B and 206B. With the second clutch 314 disengaged, the second PDU 212 is mechanically isolated from the central driveline section 308 and thus the outboard high-lift surface 206B remains stationary. Further, with the first clutch 312 disengaged, the first PDU 210 is mechanically isolated from the first outboard driveline section 306 and the outboard high-lift surface 206A remains stationary. Accordingly, adjusting the relative position between first outboard high-lift surface and the first inboard high-lift surface may include mechanically decoupling the first outboard driveline section of the first outboard high-lift surface from the first PDU via the first clutch, driving the central driveline section of the first inboard high-lift surface via the first PDU and the third clutch, decoupling the second outboard driveline section from the central driveline section via the second clutch and deactivating the second PDU, thereby mechanically moving the second inboard high-lift surface in conjunction with the first inboard high-lift surface via the central driveline section and independently of the first outboard high-lift surface and the second outboard high-lift surface.

Pursuant to an implementation, additionally or alternatively, mechanically imparting relative movement between the second inboard high-lift surface and the second outboard high-lift surface may include driving via a second PDU the second outboard driveline section of the second outboard high-lift surface independently of the first PDU, wherein the first PDU actuates the first outboard high-lift surface by driving the first outboard driveline section to adjust the position of the first outboard high-lift surface relative to the first inboard high-lift surface, and the first inboard high-lift surface and the second inboard high-lift surface remain stationary. For example, the second and third clutch 314, 316 may be disengaged (e.g., activated and decoupled), the first clutch 312 is engaged (e.g., deactivated and coupled), and the first PDU 210 and the second PDU 212 may drive the first outboard driveline section 306 and the second outboard driveline section 310, respectively, to actuate the outboard high-lift surfaces 206A, 206B independently of the inboard high lift-surfaces 204A, 204B. The PDUs 210, 212 may operate to actuate the outboard high-lift surfaces 206A, 206B symmetrically or asymmetrically, respectively.

It will be appreciated that the aforementioned system 200, apparatus 300 and/or method may be modified to have some components and steps removed, or may have additional components and steps added, all of which are deemed to be within the spirit of the present disclosure. For example, the high-lift system 200 and the drive apparatus 300 may be used to independently actuate more than four high-lift surfaces 202 without departing from the scope of the present disclosure. Further, the arrangement of PDUs 210, 212 and clutches 312, 314, 316 may be switched such that the first PDU 210, for example, is arranged on the second wing 104B and the second PDU 212 is arranged on the first wing 104A. Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed method, device and/or article will be incorporated into such future developments. Thus, the specification and the drawings are to be regarded as an illustrative thought instead of merely restrictive thought.

As used herein, spatial or directional terms such as "inboard," "outboard," "top," "bottom," "upper," "lower," "up," "down," "left," "right," "first," "second," "third," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. Additionally, use of adjectives such as first, second, etc. should be read to be interchangeable unless a claim recites an explicit limitation to the contrary.

What is claimed is:

1. A drive apparatus for differentially actuating a plurality of high-lift surfaces of an aircraft, comprising:
a common rotary driveline mechanically connected to the plurality of high-lift surfaces, the common rotary driveline having a central driveline section couplable to a first outboard driveline section and a second outboard driveline section, the first outboard driveline section and the second outboard driveline section extending outboard from the central driveline section;
a plurality of clutches incorporated into the common rotary driveline, the plurality of clutches including a first clutch provided between the first outboard driveline section and the central driveline section, and a second clutch provided between the second outboard driveline section and the central driveline section;
a first power drive unit (PDU) mechanically coupled to the common rotary driveline at a drive connection disposed in a region of the first clutch, and a second PDU mechanically coupled to the common rotary driveline at a drive connection disposed in a region of the second clutch;
wherein the first clutch and the second clutch are structured and arranged to mechanically connect and disconnect the first outboard driveline section and the second outboard driveline section from the central driveline section, respectively;
wherein the plurality of clutches further include a third clutch arranged inboard of the first clutch between the first outboard driveline section and the central driveline section, wherein the drive connection of the first PDU is interposed between the first clutch and the third clutch; and
wherein the third clutch selectively decouples the central driveline section from the drive connection of the first PDU.

2. The drive apparatus of claim 1, wherein the first clutch is arranged outboard of the first PDU to selectively decouple the first outboard driveline section from the drive connection of the first PDU and of the second PDU, and the second clutch is arranged inboard of the second PDU to selectively decouple the central driveline section from the drive connection of the second PDU.

3. The drive apparatus of claim 1, wherein the drive connection of the second PDU is mechanically joined to the second outboard driveline section.

4. The drive apparatus of claim 1, further comprising at least two first actuating stations coupled to the common driveline at different spanwise locations between a central longitudinal axis of the aircraft and an end of the first outboard driveline section, and at least two second actuating stations coupled to the common driveline at different spanwise locations between the central longitudinal axis and an end of the second outboard driveline section, wherein the first PDU and the second PDU are arranged between an inboard surface actuating station and an outboard surface actuating station of the at least two first actuating stations and the at least two second actuating stations, respectively.

5. The drive apparatus of claim 4, wherein the inboard surface actuating station of the at least two first actuating stations and the inboard surface actuating station of the at least two second actuating stations are mechanically joined to the central driveline section, the central driveline section structured and arranged to provide a continuous torque-transmitting load path in the spanwise direction.

6. A high-lift actuation system of an aircraft, comprising:
a common movable driveline mechanically connected to a plurality of high-lift surfaces of a first wing and a second wing;
a first power drive unit (PDU) arranged in the first wing between a first inboard high-lift surface and a first outboard high-lift surface of the plurality of high-lift surfaces;
a second PDU arranged in the second wing between a second inboard high-lift surface and a second outboard high-lift surface of the plurality of high-lift surfaces;
a plurality of clutches disposed at different spanwise locations on the common movable driveline structured and arranged to selectively transmit power along the common movable driveline in a spanwise direction to the plurality of high-lift surfaces;
the plurality of clutches being selectively operable in conjunction with the first PDU and the second PDU to actuate the first outboard high-lift surface and the second outboard high-lift surface independently of the first inboard high-lift surface and the second inboard high-lift surface;
wherein the plurality of clutches include a first clutch arranged between the first PDU and the first outboard high-lift surface, a second clutch arranged between the second PDU and the second inboard high-lift device, and a third clutch arranged between the first PDU and the first inboard high-lift surface, wherein the second clutch and the third clutch are mechanically coupled via a central driveline section of the common movable driveline; and
wherein the first PDU and the second PDU actuate the first outboard high-lift surface and the second outboard high-lift surface, respectively, independently from one another and independently of the first inboard high-lift surface and the second inboard high-lift surface when the second clutch and the third clutch are disengaged and the first clutch is engaged.

7. The system of claim 6, wherein the first inboard high-lift surface and the second inboard high-lift surface are mechanically synchronized via the central driveline section.

8. The system of claim 6, wherein the second PDU actuates the plurality of high-lift surfaces when the plurality of clutches are engaged, and the first PDU is back-driven.

9. The system of claim 8, wherein the first PDU is configured to independently actuate the first outboard high-lift surface when the first clutch is engaged and the third clutch is disengaged.

10. The system of claim 6, wherein the first PDU is configured to actuate the first inboard high-lift surface and the second inboard high-lift surface independent of the first outboard high-lift surface and the second outboard high-lift surface when the first clutch and the second clutch are disengaged with the third clutch engaged.

11. The system of claim 6, further comprising a controller operably coupled to the first PDU, the second PDU and the plurality of clutches, wherein the controller is configured to control the first PDU and the second PDU to actuate the first outboard high-lift surface and the second outboard high-lift surface symmetrically or asymmetrically, respectively.

12. The system of claim 6, further comprising a plurality of local actuating stations distributed in the spanwise direction operably connected to the common driveline for transferring power to the plurality of high-lift surfaces, the plurality of actuating stations each including at least one irreversible actuator operably coupled to a respective one of the plurality of high-lift surfaces.

13. A method for differentially actuating a plurality of high-lift surfaces of an aircraft using a common driveline, comprising:
adjusting a relative position between a first outboard high-lift surface and a first inboard high-lift surface of the plurality of high-lift surfaces on a first wing by mechanically decoupling a first outboard driveline section coupled to the first outboard high-lift surface from a central driveline section coupled to the first inboard high-lift surface via a first clutch and driving one of the first outboard driveline section and the central driveline section via a first power drive unit (PDU);
mechanically imparting relative movement between a second inboard high-lift surface and a second outboard high-lift surface of the plurality of high-lift surfaces on a second wing by mechanically decoupling the central driveline section coupled to the second inboard high-lift surface from a second outboard driveline section coupled to the second outboard high-lift surface via a second clutch;
adjusting the first inboard high-lift surface and the second inboard high-lift surface independently of the first outboard high-lift surface and the second outboard high-lift surface by mechanically decoupling the first outboard driveline section from the central driveline section via the first clutch and mechanically decoupling the second outboard driveline section from the central driveline section via the second clutch, and mechanically coupling the first PDU to the central driveline section via a third clutch such that the first PDU drives the central driveline section to actuate the first inboard high-lift surface and the second inboard high-lift surface.

14. The method of claim 13, wherein mechanically imparting relative movement between the second inboard high-lift surface and the second outboard high-lift surface includes driving via a second PDU the second outboard driveline section to actuate the second outboard high-lift surface independently of the first PDU with the second clutch and the third clutch disengaged and the first clutch engaged, wherein the first PDU actuates the first outboard high-lift surface by driving the first outboard driveline section, and the first inboard high-lift surface and the second inboard high-lift surface remain stationary.

15. The method of claim 13, wherein adjusting the relative position between the first outboard high-lift surface and the first inboard high-lift surface includes mechanically decoupling the first PDU from the central driveline section via the third clutch and mechanically coupling the first PDU to the first outboard driveline section via the first clutch, and driving the first outboard driveline section via the first PDU to actuate the first outboard high-lift surface.

16. The method of claim 13, further comprising actuating the plurality of high-lift surfaces by mechanically coupling the first outboard driveline section to the central driveline section via the first clutch and the third clutch, mechanically coupling the central driveline section to the second outboard driveline section via the second clutch, and driving the common driveline via a second PDU disposed in a region of the second clutch, wherein the first PDU is back-driven.

* * * * *